Sept. 11, 1956      K. L. WESTLIN      2,762,450

MULTIPLE TUBE CENTRIFUGAL DUST COLLECTORS

Filed April 26, 1954      2 Sheets-Sheet 1

INVENTOR.

KARL L. WESTLIN

BY *Arthur H Robert*

ATTORNEY

Sept. 11, 1956     K. L. WESTLIN     2,762,450
MULTIPLE TUBE CENTRIFUGAL DUST COLLECTORS
Filed April 26, 1954     2 Sheets-Sheet 2

INVENTOR.
KARL L. WESTLIN
BY *Arthur J. Robert*
ATTORNEY

United States Patent Office 2,762,450
Patented Sept. 11, 1956

2,762,450

MULTIPLE TUBE CENTRIFUGAL DUST COLLECTORS

Karl L. Westlin, Louisville, Ky., assignor to American Air Filter Company, Inc., Louisville, Ky., a corporation of Delaware Application April 26, 1954, Serial No. 425,695

6 Claims. (Cl. 183—80)

This invention relates to multiple tube centrifugal dust collectors.

A conventional multiple tube centrifugal dust collector heretofore proposed comprises: a casing providing a confined dust chamber; and a series of tubular centrifugal dust separators—each having a gas-flow end, containing an axially disposed clean gas outlet and an outer gas inlet, and, a dust-flow end containing an axially disposed gas recirculating inlet and a peripheral dust outlet—mounted in spaced parallel rows with their dust-flow ends projecting into the dust chamber.

In operation, each separator constrains the incoming gas to flow axially from its gas-flow end toward its dust-flow end in a whirling dust-centrifuging manner causing the dust to be peripherally concentrated as it approaches the dust-flow end where the relatively clean gas reverses its direction to flow axially toward the clean gas outlet while the concentrated dust and a fractional stream of gas are peripherally discharged into the dust chamber. Here the concentrated dust tends to settle downwardly into a hopper while a fractional stream of gas is sucked back into each separator through its axially disposed recirculating inlet where it joins the relatively clean gas in the center of the separator to flow axially toward the clean gas outlet.

If a conventional collector of this type be visualized as having three horizontal (top, center and bottom) rows of separators, it will be apparent that the concentration of dust in the dust chamber increases from the top to the bottom because the dust discharged by the top row will, as it falls, join that discharged by the center row while the dust passing downwardly from the center row level will ultimately join that discharged by the bottom row. This inevitably results in a loss of dust-collecting efficiency in the dust collector as a whole because the recirculating gas in each succeeding lower row necessarily contains more dust than the recirculating gas for each preceding upper row.

The principal objects of this invention are: to overcome the foregoing objections; and to provide a relatively simple and inexpensive means of preventing the dust discharged by one row from increasing the dust concentration in another row so as to maintain relatively equal dust concentrations along all rows.

A further object is to provide a relatively simple and inexpensive means of reducing, along each row, the concentration of dust in the gas available for recirculation.

The invention is illustrated in the accompanying drawings wherein:

Figure 1 is a fragmentary broken top plan view of a multiple tube dust collector constructed in accordance with my invention;

Figures 2, 3 and 4 are sectional views taken along lines 2—2, 3—3 and 4—4 respectively of Figure 1;

Figures 1–6

Figure 1:
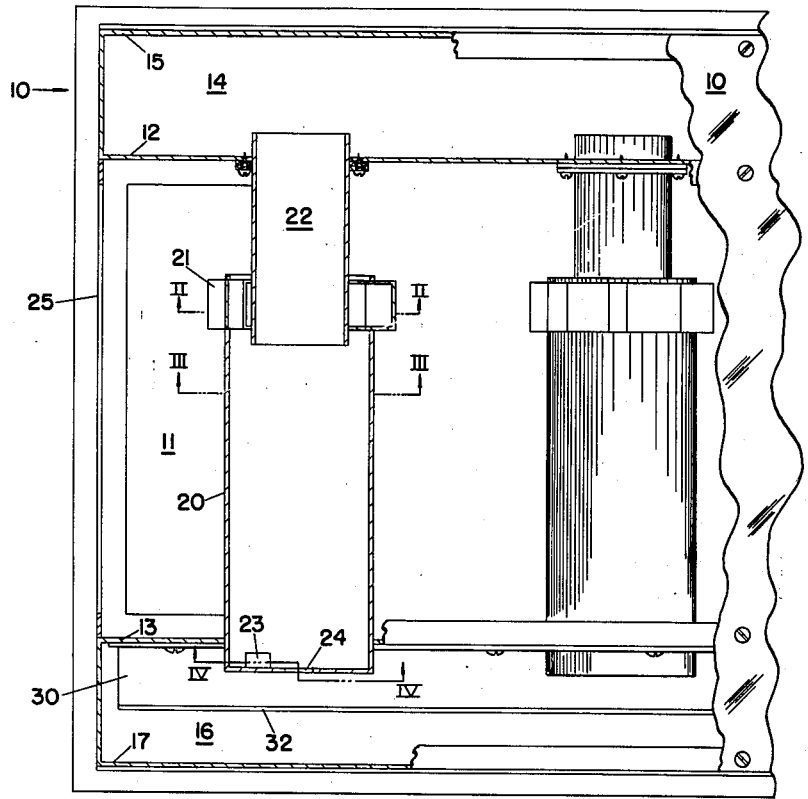
Figure 2:
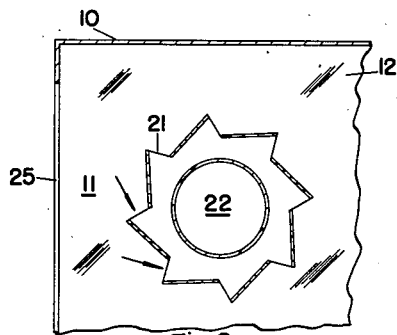
Figure 3:
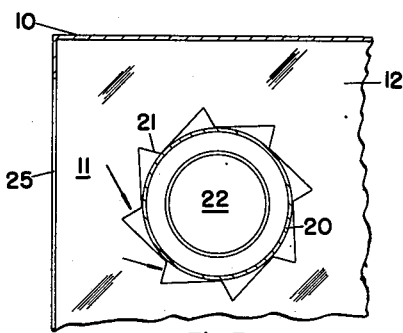
Figure 4:
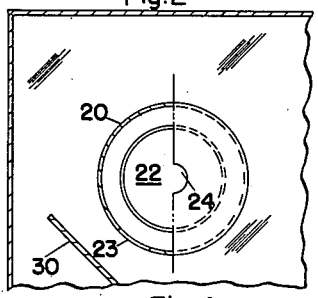
Figure 5:
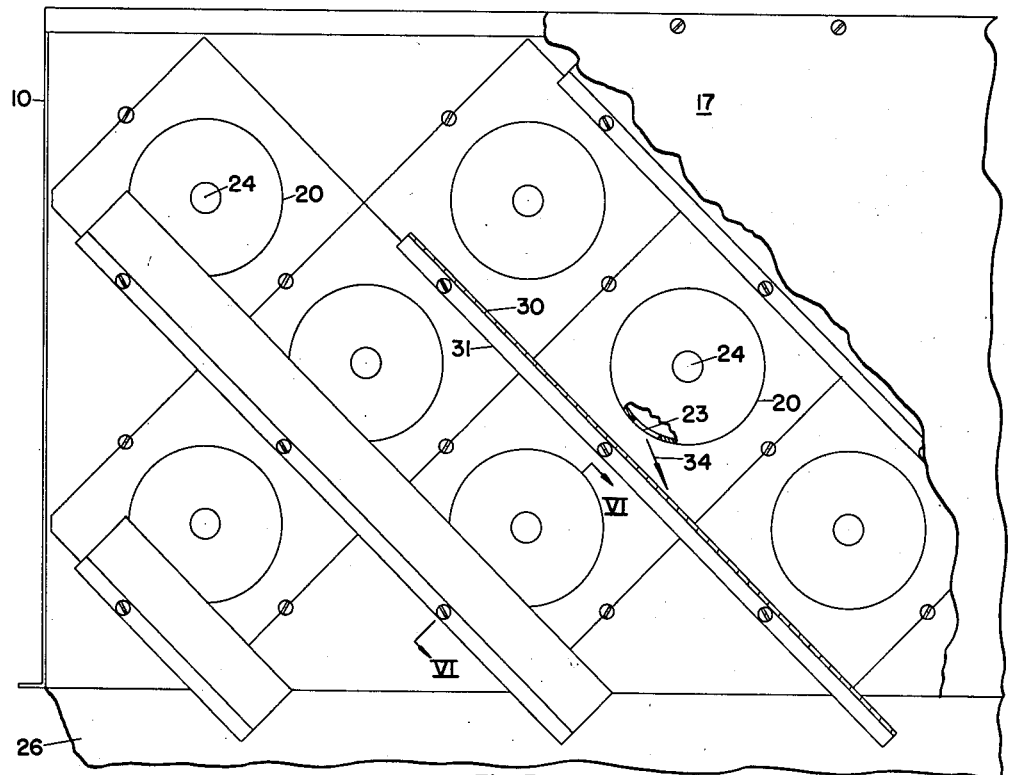
Figure 5 is a partly broken end view of the dust chamber end of the collector.
Figure 6:
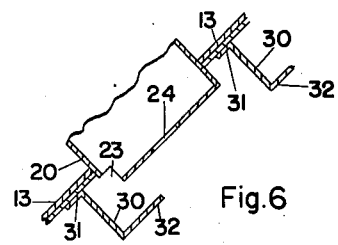
Figure 6 is a sectional view corresponding to line 6—6 of Figure 5.

The conventional portion of the structure shown in Figures 1–6 comprises: a casing 10 providing a gas inlet chamber 11 between an outlet chamber partition 12 and a dust chamber partition 13, a clean gas outlet chamber 14 adjacent one end of the inlet chamber 11 and between the outlet chamber partition 12 and the adjacent end wall 15, and a dust chamber 16 adjacent the other end of the inlet chamber 11 and between the dust chamber partition 13 and the other adjacent end wall 17; and a series of tubular centrifugal or cyclone separators 20 each having a gas flow end, containing a tangential gas inlet 21, an axial gas outlet 22, and, a dust-flow end, containing a peripheral dust discharge orifice 23 and an axial gas-recirculating orifice 24, each separator 20 extending across the gas inlet chamber 11 with its gas-flow end adjacent the outlet partition 12, its gas inlet 21 communicating with the inlet chamber 11 and its gas outlet 22 communicating with the outlet chamber 14 through an opening in the outlet partition 12, and with its dust-flow end projecting through the dust chamber partition 13 into the dust chamber 16 and its dust discharge and gas recirculating openings 23 and 24 in communication with the dust chamber 16.

In conventional operation, gas enters the inlet chamber 11 through a suitable side wall inlet opening 25 between partitions 12 and 13 and then enters each separator tangentially through its louvered inlet openings 21. Each separator 20 constrains the incoming gas to flow axially from its gas-flow end toward its dust-flow end through the separator's main tube, which is also designated 20. In so doing, the gas flows in a whirling dust-centrifuging manner causing the dust to be peripherally concentrated along the wall of tube 20 as it approaches the dust-flow end where the relatively clean gas reverses its direction of flow through tube 20 to flow axially toward clean gas outlet 22 while the concentrated dust and a fractional stream of gas are peripherally discharged through dust discharge orifice 23 into the dust chamber 16. Here the concentrated dust tends to settle downwardly into a bottom hopper 26 (not shown) while a fractional stream of gas is sucked back into each separator 20 through its axially disposed recirculating inlet 24 where it joins the relatively clean gas in the center of the separator 20 to flow axially toward the clean gas outlet 22 and ultimately into the clean gas outlet chamber 14.

In accordance with the present invention, a series of vertically spaced downwardly inclined chutes 30 are mounted in the dust chamber 16 in position to provide a downwardly inclined chute passage for each correspondingly inclined row of dust separators 20. Each chute 30 has a securing flange 31 along one downwardly inclined edge through which it is secured to the dust chamber partition 13. The opposite downwardly inclined edge of each chute 31 is provided with an upwardly extending flange 32 which is spaced from the dust chamber end wall 17 to provide between chutes and wall 17 a pressure equalizing chamber permitting gas to flow from one chute passage to another as may be required for pressure equalizing purposes.

In other words, I divide the dust chamber 16 vertically into two openly communicating sections comprising a dust handling section adjacent the partition and an equalizing pressure section adjacent the end wall. The dust handling section is subdivided between inclined chutes 30 into a series of passageways, each passageway receiving the dust-flow end of a correspondingly inclined row of separators 20. The inclination of the chutes 30, as shown, is 45°. The slope, however, of the chute should equal and preferably exceed the angle of repose of the dust which the collector is designed to handle. The angle of repose is the angle formed by the sloping sides of a pile of dust formed by dropping the dust gravitationally upon the floor and permitting it to pile up without the restraint.

When the sloping angle of the chutes equals or exceeds the angle of repose, the dust falling upon the chutes will tend to slide downwardly along the chutes rather than collect along the surface of the chutes. Preferably the separators 20 are positioned so that they will discharge the concentrated dust downwardly along the chutes as indicated by the arrow 34 in Figure 5 and thus additionally promote the downward flow of dust.

I have found that when chutes are thus provided, most of the dust precipitated on the chutes will remain thereon and thus be effectively and finally separated from the gas. As a consequence, the residue dust content of the gas in each passageway is substantially decreased with the result that that gas carries with it relatively little dust when it passes through the recirculating inlet 24 to re-enter a separator 20. Furthermore this results in very little, if any, increase in the dust concentration of the gas when proceeding along a given passageway from an upper separator in the direction of the lower separators. And finally, it very substantially restricts any flow of dust from one passageway to another. All of this is accomplished without interfering with the free flow of gas for pressure equalizing purposes.

Figure 7

Figure 7:
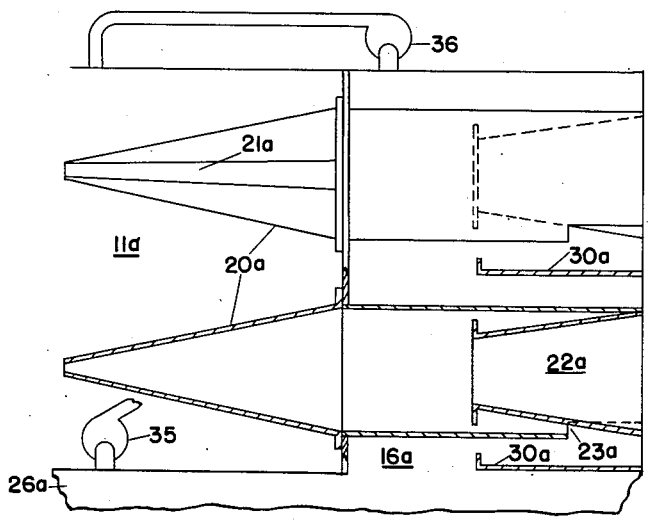
Figure 7 illustrates the present invention applied to a somewhat different type of tubular centrifugal dust collector.

The structure shown in Figure 7 is conventional, so far as this application is concerned, except for the provision of chutes 30. In this case, air enters the inlet chamber 11a, then enters each separator tangentially through its inlet opening 21a. Each separator 20a constrains the incoming gas to flow axially from its gas-flow end toward its dust-flow end through the body of the separator. In so doing, the gas flows in a whirling dust centrifuging manner causing the dust to be peripherally concentrated along the wall of the separator as it approaches the dust-flow end where the relatively clean gas passes through a centrally disposed conically shaped gas outlet 22a while the concentrated dust and a fractional stream of gas is peripherally discharged through dust orifice 23a into the dust chamber 16a. Here the concentrated dust strikes and slides down along chutes 30a ultimately entering hopper 26a while a fractional stream of gas is pumped back into each inlet chamber 11a either through a hopper air pump 35 or through a dust chamber air pump 36.

Having described my invention, I claim:

1. A dust collector comprising: a casing providing a confined dust chamber; a first downwardly inclined chute mounted in the dust chamber with dust chamber space above it; a first centrifugal dust separator projecting horizontally into the dust chamber, said separator having a dust laden gas outlet adjacent said first chute and being operative to direct a stream of dust laden gas downwardly along the first chute and in intersecting relationship with it; a second downwardly inclined chute mounted in the dust chamber with dust chamber space above it, said second chute being vertically spaced from the first mentioned chute; and a second centrifugal dust separator projecting horizontally into the dust chamber, said second separator having a dust laden gas outlet adjacent said second chute and being operative to direct a stream of dust laden gas downwardly along the second chute and in intersecting relationship with it.

2. The collector of claim 1 including: means providing space for the flow of pressure equalizing gas between the spaces above each chute.

3. The collector of claim 2 including: means for recycling gas from the dust chamber at least partially through said separators.

4. A multiple tube centrifugal dust collector comprising: casing means providing a confined dust chamber, an adjacent gas inlet space and a gas outlet space; a series of spaced superposed downwardly inclined chutes mounted in the dust chamber to provide a series of downwardly inclined chute passageways; and a series of horizontally extending tubular centrifugal dust separators arranged in inclined rows corresponding to said inclined passageways and into the corresponding chute passageway and to extend at least partially across the dust chamber, each separator having gas inlet and outlet openings respectively communicating with said inlet and outlet spaces and also having a dust discharge opening communicating with the corresponding chute passageway, said dust discharge opening being positioned adjacent the chute below it to discharge dust downwardly along that chute and in intersecting relationship with it.

5. The collector of claim 4 including: means providing space along an inclined edge of said chutes for the flow of pressure equalizing gas between the chute passageways.

6. The collector of claim 4 wherein each separator has: its gas inlet and outlet openings disposed adjacent one end of the separator to impart a swirl to the incoming gas and to discharge the outgoing gas axially and its dust discharge opening peripherally disposed adjacent its opposite end in position to discharge dust more or less tangentially; and recirculating passage axially disposed at its dust discharge end to receive gas from the dust chamber and discharge that gas back into the separator.

References Cited in the file of this patent

UNITED STATES PATENTS

| | | |
|---|---|---|
| 2,490,116 | Danz | Dec. 6, 1949 |
| 2,515,894 | Polk | July 18, 1950 |
| 2,533,991 | Blomquist et al. | Dec. 12, 1950 |
| 2,662,610 | Heinrich | Dec. 15, 1953 |

FOREIGN PATENTS

| | | |
|---|---|---|
| 470,087 | Canada | Dec. 12, 1950 |
| 580,936 | Great Britain | Sept. 25, 1946 |
| 628,212 | Great Britain | Aug. 24, 1949 |
| 674,536 | Great Britain | June 25, 1952 |